United States Patent [19]

Simmons

[11] Patent Number: 4,746,253
[45] Date of Patent: May 24, 1988

[54] FISHING LINE MOVEMENT INDICATOR

[75] Inventor: Billy R. Simmons, Odenville, Ala.

[73] Assignee: Nancy B. Crews, Odenville, Ala.

[21] Appl. No.: 82,330

[22] Filed: Aug. 6, 1987

[51] Int. Cl.$^4$ .............................................. A01K 97/00
[52] U.S. Cl. ........................................ 43/17; 43/18.1; 43/21.2; 43/25
[58] Field of Search .................... 43/17, 18.1, 21.2, 25

[56] References Cited

U.S. PATENT DOCUMENTS

| 2,619,559 | 11/1952 | Schenkel | 43/17 |
| 2,948,076 | 8/1960 | Patricello | 43/17 |
| 3,143,822 | 8/1964 | Schooley | 43/17 |
| 3,740,888 | 6/1973 | Young | 43/17 |
| 3,916,554 | 11/1975 | Hullett | 43/17 |
| 4,633,608 | 1/1987 | Savarino | 43/17 |

FOREIGN PATENT DOCUMENTS

| 305096 | 10/1968 | Sweden | 43/17 |
| 1003095 | 9/1965 | United Kingdom | 43/17 |

Primary Examiner—Gene P. Crosby
Attorney, Agent, or Firm—Jennings, Carter, Thompson & Veal

[57] ABSTRACT

A fish detector for use with a rod and reel detects the movement of the line by deflection of a flexible member which engages the line near the reel and holds it outwardly from the rod. The flexible member is more flexible than the rod tip and may be coated with visibility enhancing material such as plastic.

5 Claims, 1 Drawing Sheet

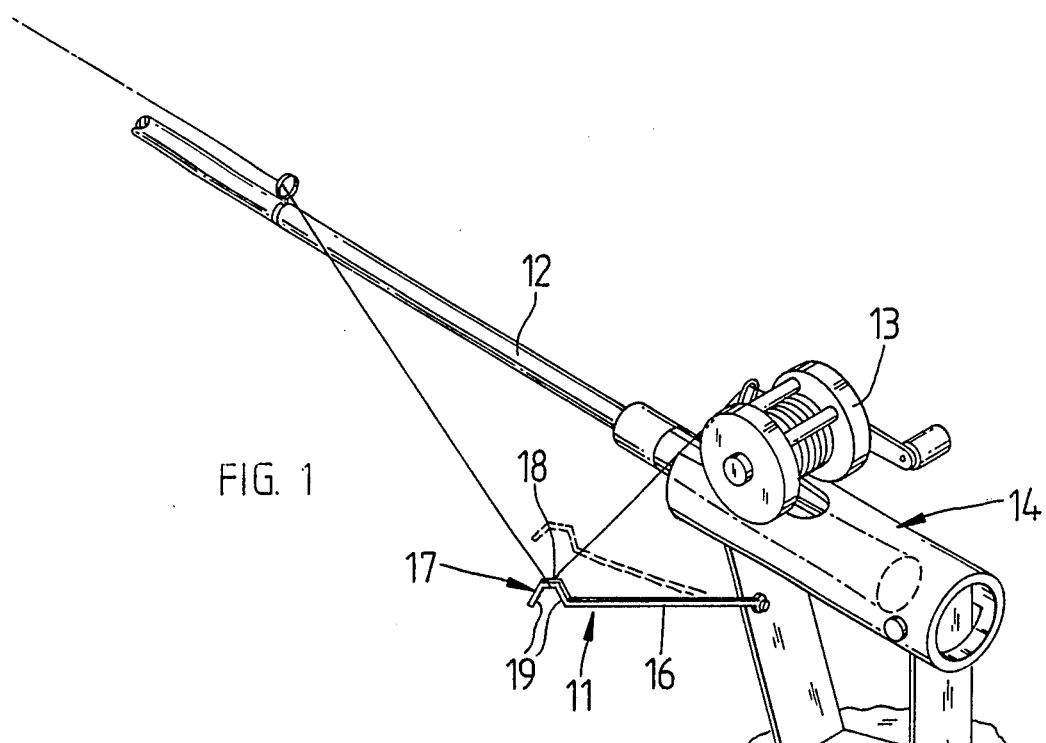
FIG. 1
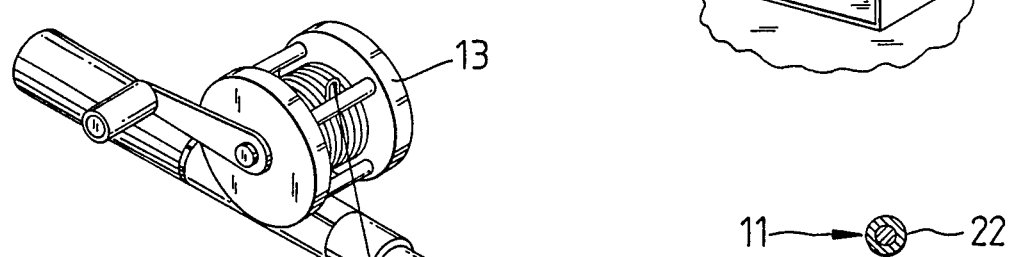
FIG. 2
FIG. 4
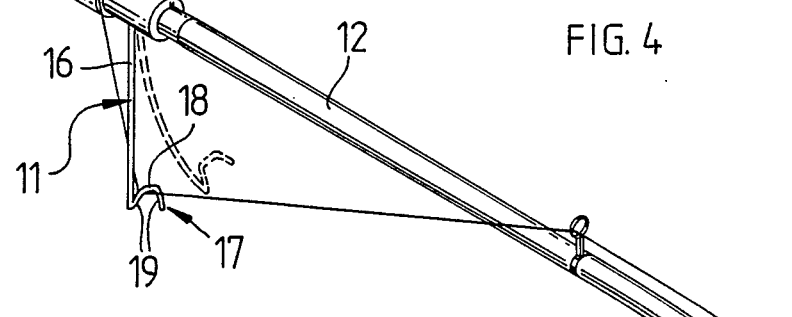
FIG. 3

FISHING LINE MOVEMENT INDICATOR

FIELD OF THE INVENTION

The present invention relates to fishing equipment and more particularly to equipment for detecting when a fish has taken the bait. Even more particularly, the present invention may be characterized as a visual indicator of line movement response to a fish's activities.

BACKGROUND OF THE INVENTION

The hook and line fisherman has long matched wits with the inhabitants of the marine world. Whether based in fact or fantasy, fishing lore has it that more often than not the fisherman is not as successful as his superior cranial capacity might indicate. Thus, for years, fishermen have sought after some advantage that would increase their rate of success in their chosen sport. Everyone is familiar with the float, made either of cork or plastic, which is attached to the line to indicate when a fisherman has a "bite". However, such floats are not useful in all applications and are subject to the contrary conditions of the water, waves, and/or boat, thus they leave something to be desired, particularly when "bottom fishing". Other apparatus, such as my "Fishing Rod Hold with Automatic Hook Setter" disclosed in U.S. Pat. No. 4,550,519, have been devised to assist the fisherman in hooking the fish; however, they are generally cumbersome or expensive and have not enjoyed wide popularity.

SUMMARY OF THE INVENTION

It is the object of the present invention to provide a line motion detector for use with fishing rods which indicates a movement of the bait prior to deflection of the rod tip.

The primary object of the present invention is to enable a fisherman to set the hook in a fish at the proper moment.

To accomplish these objects, I utilize a very sensitive line pickup which is offset from the axis of the rod. The line is positioned on the pickup such that the line is deflected away from the rod. Movement of the bait exerts pressure on the pickup and causes it to deflect toward the rod, thereby indicating the presence of the fish. The pickup is more flexible than the rod tip, thus this fish is detected earlier than can be done by observing the rod tip.

BRIEF DESCRIPTION OF THE DRAWINGS

Line motion detectors incorporating features of my invention are depicted in the accompanying drawings which form a portion of this application and wherein:

FIG. 1 is a perspective view showing the indicator attached to a rod holder;

FIG. 2 is a perspective view of the indicator mounted beneath a rod; and

FIG. 3 is a perspective view of the indicator serving as a floating eye for the line.

FIG. 4 is a cross-sectional view of the indicator.

DESCRIPTION OF THE PREFERRED EMBODIMENTS

Referring to the drawings for a better understanding of the invention, it will be noted that my fishing line movement indicator 11 is shown in conjunction with a rod 12, reel 13, and holder 14. The rod 12 and reel 13 may be any of a number of common types available on the market. The holder 14 may also be one of several varieties; however, the present invention is most suited for use with a holder 14 as disclosed in my prior U.S. Pat. No. 4,637,156, which is incorporated herein by reference. As is well known, rod manufacturers have made their fishing rods in a variety of ranges of rigidity and have made the tip end thereof somewhat flexible so that anglers may note a deflection of the rod tip as a fish takes the bait. However, this flexibility is limited in that the tip must be sufficiently strong to endure the rigors of landing a hooked fish without becoming deformed. Consequently, it has been learned that the sensitivity of the rod tip and the ability to sense significant motion of the bait and line by visual sighting of the rod tip is inadequate. My indicator therefore is designed to enhance the sensitivity of the angler's equipment and thereby allow him to more accurately determine when to set the hook.

The indicator 11 is essentially a flexible line pickup member having an elongated portion 16 and a line engaging portion 17. The elongated portion is attached at one end either to the holder 14 or the rod 12 as shown in the Figures. As may be seen, the elongated portion 17 lies in a plane that is transverse to the axis of the rod 12 such that the line is deflected radially from the axis of the rod 12 when engaged by the indicator 11.

The precise angle at which the elongated portion 17 is mounted may be adjusted by the user and is somewhat dependent on the line engaging portion and whether the indicator 11 is mounted to the holder 14 or the rod 12. Preferably, the indicator is mounted on the holder 14 at a position beneath the reel 13 and extending laterally thereof. In this embodiment, the line engaging portion is an open trough-like member having a region 18 offset from the axis of the elongated portion 17 toward the rod 12. The region 18 is bounded at each end by an inclined barrier section 19 which retains the line in the trough-like line engaging portion 17. A similar line engaging portion may be used when the indicator 11 is attached to the rod 12 as shown in FIG. 2. In this embodiment, the indicator is attached to the rod 12 forwardly of and beneath the reel 13. The line may be positioned on either side of the rod 12 to engage the indicator 11. An alternative rod mounted indicator 11 is shown in FIG. 3, wherein the line engaging portion 17 is a closed loop 21 through which the line is passed in the same manner as the line guides commonly found on the rod.

The indicator 11 may be of a one piece construction utilizing an appropriately resilient material such as a length of spring steel wire. I have found that for fresh water fishing an indicator 11 made from 10 gauge wire works extremely well. Furthermore, the use of the wire lends itself to forming the line engaging portion into the desired shape. It may be desirable to make the loop 21 of the embodiment from ceramic or other well-known guide materials to reduce abrasion on the line. I have also found that utilizing a wire with a plastic coating 22 improves visibility of the indicator 11, particularly at night. As is well known, the plastic coating 22 may be impregnated with compounds which give the indicator 11 a luminescent quality or which enhance the reflectivity of the indicator 11. Further, the plastic increases the diameter of the wire without appreciably affecting the flexibility or resiliency thereof.

To use my indicator 11, the fisherman simply makes his cast to position his bait in the usual manner and when his rod 12 is positioned as he wishes either in the holder 14 or in his hand or otherwise, he places the line in the line engaging portion 17. Of course, in the embodiment shown in FIG. 3, the line is always engaged in the portion 17. The indicator may be observed to detect the action of the fish. If the bait is a live minnow, small deflections in the indicator 11 will be noted. However, regardless of the bait, when a fish takes the bait, the indicator 11 will deflect several inches through an arc of several degrees before the rod tip will move appreciably. Thus the angler using my indicator 11 will know that a fish has taken the bait before the fish will be able to detect the rod tip. Since it is believed, from observation, that fish will drop bait with an unnatural feel, the indicator 11 should allow the angler to set the hook before the fish can drop the "unnatural" bait. In the embodiments of FIGS. 1 and 2, the line is released from the line engaging portion 17 by the pressure exerted when the hook is set or by lifting the rod 12 from the holder 14.

While I have shown my invention in various forms, it will be obvious to those skilled in the art that it is not so limited but is susceptible of various changes and modifications without departing from the spirit thereof.

What I claim is:

1. An attachment for providing a visual indication of line movement for use with a fishing rod or rod holder comprising:
   (a) a first elongated portion lying in a plane transverse to the longitudinal axis of said rod, said elongated portion being resilient and having greater flexibility than said rod at its tip; and
   (b) a line engaging portion formed on said elongated portion distal said rod and terminating said elongated portion;
   (c) said elongated portion and said line engaging portion being made from spring steel wire of about 0.024 inch diameter;
   (d) said wire being sheathed in lightweight plastic having luminescent properties.

2. The attachment as defined in claim 1 wherein said line engaging portion comprises a region offset toward said line and boundary on each side thereof retaining said line in said offset region.

3. The attachment as defined in claim 1 wherein said elongated portion is attached to said rod and is inclined toward the tip of said rod substantially in a plane coincident with said rod.

4. The attachment as defined in claim 1 wherein said elongated portion is attached to a rod holder supporting said rod and is inclined outwardly relative to said rod holder.

5. An attachment for providing a visual indication of line movement for use with a fishing rod or rod holder comprising:
   (a) a first elongated portion lying in a plane tranverse to the longitudinal axis of said rod, said elongated portion being resilient and having greater flexibility than said rod at its tip;
   (b) a line engaging portion formed on said elongated portion distal said rod and terminating said elongated portion;
   (c) said elongated portion and said line engaging portion being made from spring steel wire;
   (d) said wire being sheathed in lightweight plastic having luminescent properties.

* * * * *